United States Patent [19]
Watanabe et al.

[11] Patent Number: 4,968,513
[45] Date of Patent: Nov. 6, 1990

[54] PROCESS FOR PREPARING PHOSPHORUS-REDUCED COW MILK

[75] Inventors: Shiro Watanabe; Hiroshi Nakashima, both of Yamanashi, Japan

[73] Assignee: Terumo Kabushiki Kaisha, Tokyo, Japan

[21] Appl. No.: 337,611

[22] PCT Filed: Oct. 6, 1987

[86] PCT No.: PCT/JP87/00747
§ 371 Date: Apr. 5, 1989
§ 102(e) Date: Apr. 5, 1989

[87] PCT Pub. No.: WO88/02219
PCT Pub. Date: Apr. 7, 1988

[30] Foreign Application Priority Data

Oct. 6, 1986 [JP] Japan .................. 61-236079

[51] Int. Cl.$^5$ .................. A23C 7/04; A23C 9/12
[52] U.S. Cl. .................. 426/42; 426/34; 426/74; 426/580; 426/271; 426/491
[58] Field of Search .................. 426/34, 38, 39, 40, 426/42, 61, 580, 860, 601, 74, 271, 491

[56] References Cited

U.S. PATENT DOCUMENTS 4,663,172  5/1987  Wenner .................. 426/271

FOREIGN PATENT DOCUMENTS 3719977  12/1988  Fed. Rep. of Germany ...... 426/801
0764079   8/1971  France .................. 426/580
46-25697  7/1971  Japan .
0008767   1/1979  Japan .................. 426/801

Primary Examiner—Marianne Cintins
Attorney, Agent, or Firm—Burns, Doane, Swecker & Mathis

[57] ABSTRACT

The phosphorus-reduced cow milk of the invention contains a reduced proportion of phosphorus of 1.0 g to 2.0 g per 100 g of protein in the cow milk, the weight ratio of phosphorus to calcium being 1:2, nearly the same as that of human milk. The ratio is most adequate for calcium absorption and is suitable as food for kidney-disease patients with reduced calcium-absorbing function, persons of old age and hyperphosphatemia patients. Moreover, the phosphorus-reduced cow milk of the invention in which only phosphorus component is selectively removed and none of other component is lost maintains the value of cow milk as perfect food.

1 Claim, No Drawings

PROCESS FOR PREPARING PHOSPHORUS-REDUCED COW MILK

TECHNICAL FIELD

The present invention relates to phosphorus-reduced cow milk and a process for preparing the same. More particularly, it is concerned with phosphorus-reduced cow milk only phosphorus content of which is reduced and a process for preparing phosphorus-reduced cow milk which comprises subjecting milk the serum to reduction treatment of a phosphorus content.

The phosphorus-reduced cow milk according to the invention is valuable as food for hyperphosphatemia patients, kidney-disease patients with calcium-absorbing function impaired and persons of old age.

BACKGROUND ART

Cow milk is an excellent food containing almost all nutrients and well absorbed by digestion and is especially suitable as a diet for the sick. Weight ratio of phosphorus to calcium in cow milk (0.9:1), however, is undesirable from the viewpoint of calcium absorption, because approximately 42% of the calcium in the milk exists in colloid phase such as phosphate salts which is in difficultly absorbable state. It is desirable from the viewpoint of calcium absorption that weight ratio of phosphorus to calcium in food is around 1:2 as it is in human milk. Higher levels of phosphorus than the above will form calcium phosphate to insolubilize the calcium and hinder absorption of the calcium. Whereas phosphorus excess in such a degree as mentioned above does not cause troubles in healthy persons, it is desired to decrease phosphorus content in cow milk to a phosphorus to calcium ratio of about 1:2 when taken by kidney-disease patients with deteriorated calcium-absorbing function, persons of old age, patients with calcium-metabolism abnormality, and hyperphosphatemia patients. For this purpose, phosphorus in cow milk which is contained in an amount of approximately 3 g per 100 g of protein should be reduced to 1.0–2.0 g.

Heretofore, for reducing phosphorus content in cow milk there are known a process according to which an alkali solution of casein separated from cow milk is heattreated at 60°–150° C. for 2 sec. to 60 min. and the treated casein solution is subjected to an ion-exchange treatment (Japanese Patent Publication No. 25697/1971) and a process according to which skimmed milk is acidified to a pH of 5.2 –6.0 and the acidified skimmed milk is passed through an ion-exchange material (Japanese Patent Laid-open to Public No. 256342/1985).

According to the above-mentioned prior-art methods, the treatment with an ion-exchange material is associated with a disadvantage that other useful acid and mineral components are also removed together with phosphorus, although the phosphorus content in cow milk can be reduced. Process by means of a membrane dialysis instead of an ion-exchange material which is also known is disadvantageous in that nutrients with a molecular weight similar to that of phosphorus are simultaneously removed.

Therefore, the object of the invention is to provide phosphorus-reduced cow milk with the content of only phosphorus in cow milk reduced to the degree that is contained in human milk and a process for preparing the same.

DISCLOSURE OF THE INVENTION

The first of the invention comprises phosphorus-reduced cow milk only the phosphorus content of which is reduced to a proportion of 1.0–2.0 g per 100 g of protein.

The second invention is concerned with a process for preparing the above-mentioned cow milk which comprises adding an acid and/or rennet to cow milk to cause agglutination of casein, separating the agglutinated casein, adding to the remaining milk serum a calcium salt to precipitate free phosphoric acid contained in the milk serum as calcium phosphate with lower solubility, removing the calcium phosphate, adding to the remaining solution the above-separated casein to a phosphorus content of 1.0–2.0 g per 100 g of protein and then emulsifying the product.

"Cow milk" as used herein as the starting material may be any of raw milk, ordinary milk, processed milk and skimmed milk produced by removing cream by centrifugal separation. Such liquid milk usually contains 0.09–0.10% of phosphorus while containing 2.9–3.6% of protein, proportion of the phosphorus to the protein being approximately 3%. As the cow milk may also be used a reconstitution product of commercially available skim milk powder redissolved in water. Phosphorus content of the product is almost the same as that of cow milk.

"Casein" is phosphoprotein which is the main component of milk proteins and exerts property as being precipitated at the isoelectric point when pH is adjusted to 4.6 by adding an acid to the milk.

"Milk serum" is a clear greenish yellow solution remaining after removal of the casein precipitates formed by adding an acid or rennet to cow milk or skimmed milk. Protein and phosphorus contained in milk serum are about 0.3–0.7% and 0.063–0.071%, respectively.

First, according to the process of the invention, an acid is added to the starting cow milk or skimmed milk, or as needed, rennet is reacted to precipitate casein. There is no particular limitation to the nature of the acid, and such an acid as hydrochloric, lactic, acetic or sulfuric acid is preferably employed. Amount of the acid to be added is variable and is such that pH of the resulting solution is in the range of 4–5 and preferably around 4.6. The temperature during the addition may be room temperature. "Rennet" is a name of the enzyme product used for coagulation of cow milk, which is a protease. The addition of rennet may be performed either in place of or in addition to the addition of an acid. If rennet is used, it is uniformly mixed with stirring in a proportion of 0.002–0.004% by weight against the starting cow milk. In this case, addition of 0.02% by weight of calcium chloride to the cow milk and adjustment to a pH of around 4.8 and a temperature of 30°–40° C. facilitate coagulation of casein.

As described above, addition of an acid or action of rennet precipitates casein, which is isolated by centrifugal separation (at approximately 1000 rpm for about 5 min.) or by filtration. From the remaining supernatant, or milk serum is removed phosphorus by the calcium precipitation method.

The calcium precipitation method represents a method which involves insolubilizing free phosphoric acid contained in milk serum in the form of calcium phosphate with lower solubility to precipitate it.

To the milk serum thus obtained is added approximately 0.1% by weight to 2.0% by weight of a calcium salt, preferably calcium chloride. It is necessary to add 3 moles or more of the calcium salt per 2 moles of phosphoric acid in the milk serum. The calcium phosphate thus formed is precipitated by adjusting pH to 6.5–7.0 by the addition of sodium hydroxide or the like. The white crystalline calcium phosphate is removed by centrifugal separation (at approximately 1500 rpm for 5 min.) or by filtration. It is only calcium phosphate that is precipitated in the above-mentioned pH range, in which calcium lactate and others are not precipitated so that none of valuable nutrients in cow milk except phosphorus is lost.

The solution obtained by the dephosphorylation treatment is mixed with the previously separated casein and the mixture is homogenized while adjusting pH to 6.5–6.7 by the use of sodium hydroxide or the like.

If skimmed milk is employed as the starting material, milk fat (cream) is subsequently added, and additives such as an emulsifier are added as needed. Subsequently, the mixture is heated to a temperature of 50° C.–60° C., thoroughly stirred and emulsified in a homogenizer under pressure of at 100 kg/cm$^2$–500 kg/cm$^2$, preferably 200 kg/cm$^2$ and then heated to a temperature of 60° C.–65° C. for stabilization. Phosphorus content of the emulsion thus obtained is about 20–50% as compared with the starting cow milk and, an efficiency of phosphorus-reduction is of about 50–80%. If desired, the emulsion can be filled in a container such as paper pack, aluminum pack or can, sterilized and utilized as phosphorusreduced cow milk. The emulsion may also be subjected to spray drying treatment to prepare a powdered milk product.

The invention will be described below in more detail with reference to an example.

EXAMPLE 1

1200 ml of commercially available cow milk (non-standardized) was subjected to a centrifuge (at 3,000 rpm for 20 min.) for separation of the cream layer to prepare approximately 1,000 ml of skimmed milk. Weight of protein and phosphorus contained in the skimmed milk were 2.67 g/100 ml and 93.1 mg/100 ml, respectively (corresponding to 3.49 g of phosphorus per 100 g of protein). The skimmed milk was adjusted to a pH of 4.6 with 2N hydrochloric acid, and casein was thereby precipitated.

The whole mass was subjected to a centrifuge (at 3,000 rpm for 10 min.), and to the precipitates was added water to collect 100 ml of the casein fraction.

Separately, 950 ml of the supernatant was collected, and weights of protein and phosphorus contained therein were measured. The protein was 650 mg/100 ml and the phosphorus 70.5 mg/100 ml. To remaining 900 ml of the supernatant was added calcium chloride to a concentration in the solution of approximately 1%. pH of the solution was adjusted with 2N sodium hydroxide to 6.5–7, and white crystals formed were filtered off. Weights of protein and phosphorus contained in the filtrate were measured to find that they were 530 mg/100 ml and 8.6 mg/100 ml, respectively. The filtrate, 800 ml in volume was mixed with 95 ml of the previously separated casein fraction, and pH of the mixture was adjusted with sodium hydroxide to around 6.6. To the resulting mixture was added an emulsifier (Trade name: Exel 300) in a proportion of approximately 0.06% to prepare an emulsion.

The emulsion thus produced, 900 ml in volume contained 2.51 g/100 ml of protein and 29.5 mg/100 ml of phosphorus (corresponding to 1.17 g of phosphorus per 100 g of protein), which was favorably used for food as phosphorusreduced cow milk.

If it is intended to adjust weight of the phosphorus to 2.0 g, the calcium chloride added as above may be to a concentration of approximately 0.5%.

INDUSTRIAL APPLICABILITY

The phosphorus-reduced cow milk according to the invention can favorably be used as food for hyperphosphatemia patients, kidney-disease patients with impaired calciumabsorbing function and persons of old age. Therefore, the invention is applicable in industrial fields such as food industry and pharmaceutical industry.

What is claimed is:

1. A process for preparing phosphorusreduced cow milk which comprises adding an acid and/or rennet to cow milk to cause agglutination of casein, separating the agglutinated casein from the cow milk to obtain a remaining milk serum, adding to the remaining milk serum a calcium salt to precipitate free phosphoric acid contained in the milk serum as calcium phosphate with lower solubility, removing the calcium phosphate from the milk serum to obtain a remaining solution, adding to the remaining solution the agglutinated casein to a phosphorus content of 1.0–2.0 g per 100 g of protein to obtain a product and emulsifying the product.

* * * * *